United States Patent
Bowman et al.

[15] 3,692,387
[45] Sept. 19, 1972

[54] ANTI-GLARE REAR VIEW MIRROR WITH HOUSING MOLDED OF PLASTIC MATERIAL

[72] Inventors: Karl R. Bowman; Lawrence L. Jemison, Jr.; Orval H. Parker, all of Anderson, Ind.

[73] Assignee: General Motors Corporation, Detroit, Mich.

[22] Filed: Feb. 25, 1971

[21] Appl. No.: 118,624

[52] U.S. Cl. .................................................. 350/281
[51] Int. Cl. ............................ B60r 1/04, G02b 7/18
[58] Field of Search ........................... 350/279–283

[56] References Cited

UNITED STATES PATENTS 2,910,915   11/1959   Harris ........................ 350/280

FOREIGN PATENTS OR APPLICATIONS 1,536,444   7/1968   France ........................ 350/280

*Primary Examiner*—John K. Corbin
*Attorney*—J. L. Carpenter, E. J. Biskup and P. D. Sachtjen

[57] ABSTRACT

An anti-glare rear view mirror wherein a one-piece plastic housing includes a mirror casing and support base which are hingedly connected at an integral flexible web. A prismoidal mirror element carried by the casing is selectively pivoted about the web between "day" and "night" viewing positions by cooperating finger actuated tabs and detents formed on the casing and the support base.

1 Claim, 8 Drawing Figures

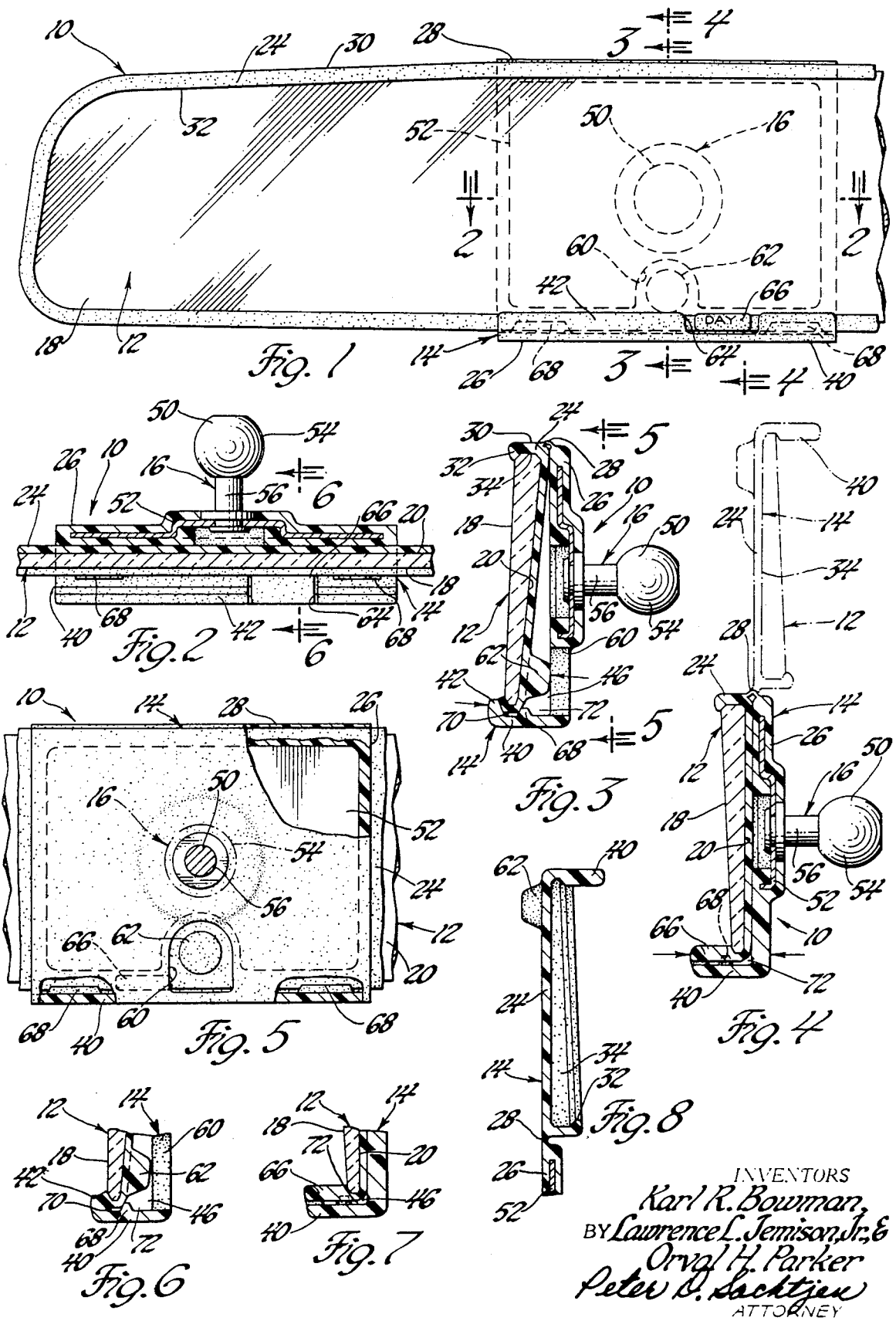

ANTI-GLARE REAR VIEW MIRROR WITH HOUSING MOLDED OF PLASTIC MATERIAL

The present invention relates to rear view mirrors for motor vehicles and, in particular, to a nonglare or anti-glare rear view mirror of the type using a prismoidal mirror having plural reflecting surfaces which are selectively tilted to present one or the other for viewing.

Currently, anti-glare rear view mirrors are provided as standard equipment on most vehicles. These assemblies conventionally use a manually actuated tilting mechanism located interior of the mirror casing to selectively pivot the mirror element between a high reflectivity "day" viewing position and a low reflectivity "night" viewing position. At a minimum, the prior art assemblies require four distinct components: a mirror element, generally prismoidal, having plural reflecting surfaces; a mirror casing holding the mirror element and defining an interior cavity; a tilting plate mounted on a support and located within the cavity and pivoted to the casing; and an external actuating knob operably connected to the tilting plate for pivoting the latter relative to the casing to present the desired reflecting surface for viewing. These various parts are, of course, assembled by additional fasteners and forming operations with a resultant increase in cost and complexity.

The present invention contemplates a significantly simplified construction by providing an anti-glare rear view mirror comprising only two basic parts. Rather than using independent and distinct parts for the tilting mechanism and housing, a molded plastic one-piece housing is provided which serves the ternary function of retaining the mirror element, and actuating and tilting the mirror relative to its support. More particularly, the housing is the form of a one-piece generally T-shape molding wherein the horizontal leg and the vertical leg are hingedly connected by an integral web of reduced thickness. The horizontal leg or mirror casing includes a recessed cavity which receives the mirror element with a snap fit. The vertical leg or support base is adapted to be connected to a suitable support structure on or adjacent to the vehicle windshield. From its generally planar molded state, the mirror casing and mirror element are reversely folded about the web into overlapping juxtaposed spaced relationship with the base. A shifting channel formed in a forwardly projecting leg of the base retains the lower edge of the casing to limit pivotal movement of the mirror element between a forward and a rearward position. Cooperating tabs and detents formed on the casing and mounting plate are finger actuated to selectively tilt the mirror element between the aforementioned positions to thereby establish "day" and "night" viewing positions.

Accordingly, an object of the present invention is to provide an anti-glare rear view mirror wherein a one-piece hinged housing accommodates controlled movement of a prismoidal mirror element between plural viewing positions.

Another object of the present invention is to provide a rear view mirror wherein a one-piece molded housing includes a pair of sections pivotally connected by an integral hinge with the mirror element being carried by one section and the other section being attached to a mounting member, the sections being selectively pivotable about the hinge between "day" and "night" viewing positions and being held thereat by integral detent means.

A further object of the present invention is to provide simplified triggering mechanism for shifting a prismoidal mirror element between "day" and "night" viewing positions wherein a molded one-piece plastic housing includes a casing hingedly connected to a support base by an integral web, the casing carrying the prismoidal mirror element and being shiftably retained in a channel formed on the support base by cooperating integral tabs and detents which selectively yieldably hold the mirror element in plural positions to present a desired reflecting surface for viewing.

These and other objects will be apparent to one skilled in the art upon reading the following detailed description, reference being made to the accompanying drawings showing a preferred embodiment in which:

FIG. 1 is a front elevational view of an anti-glare rear view mirror made in accordance with the present invention;

FIG. 2 is a view taken along line 2—2 in FIG. 1;

FIG. 3 is a view taken along line 3—3 of FIG. 1 showing the mirror in the "night" viewing position;

FIG. 4 is a view taken along line 4—4 of FIG. 1 showing the mirror in the "day" viewing position;

FIG. 5 is a view taken along line 5—5 of FIG. 3;

FIG. 6 is a fragmentary view taken along line 6—6 of FIG. 2 showing the mirror in the "night" viewing position;

FIG. 7 is a view similar to FIG. 6 showing the mirror in the "day" viewing position; and FIG. 8 is a cross-sectional view showing the one-piece plastic housing in the molded state.

Referring to the drawings, there is shown an anti-glare rear view mirror 10 comprising a prismoidal mirror element 12, a housing 14, and a mirror support 16. The mirror 10, as hereinafter described, provides an arrangement wherein the mirror element 12 is selectively pivoted between two viewing positions, one of which is used under conditions of normal visibility and the other of which is used to provide a rearward image of reduced intensity such as desirable to reduce the headlight glare from following vehicles.

The mirror element 12 is of a conventional prismoidal construction that is generally wedge-shape when viewed in transverse cross-section. More specifically, the mirror element 12 includes upwardly diverging front and rear reflecting surfaces, numbered 18 and 20 respectively. The rear surface 20 is provided with a reflective coating formed by any suitable process such as aluminizing. With this construction, different reflective powers are provided by the front surface 18 and the rear surface 20. Preferably, the front surface 18 has about a 4 percent reflectivity while the rear surface 20 has about a 90 percent reflectivity. Therefore, by selectively positioning the mirror element 12, the driver can present for viewing the reflecting surface best suited to his immediate driving requirements.

Referring to FIGS. 3 and 4, the mirror housing 14 is molded in a single piece from a plastic material and generally comprises a mirror casing 24 and a support base 26 which are mutually pivotally connected at their upper horizontal edges by an integral web 28 having a distinctly reduced thickness in comparison with adjoining sections. The mirror casing 24 includes a forwardly projecting peripheral flange 30 which terminates at an inwardly turned rim 32. The flange 30 and the rim 32 define a forwardly opening mirror receiving cavity 34, which is slightly smaller in peripheral configuration than the mirror element 12. In assembly, the mirror element 12 is snapped or pressed into the mirror cavity 34 and securely held therein by the resiliency of the flange 30 and the rim 32. The support base 26 is generally rectangular and has a considerably lesser width than the casing 24. A forwardly projecting ledge 40 is formed along the lower horizontal edge of the support base. The ledge 40 terminates with an upwardly turned lip 42 which defines with the front surface of the base 26 a transverse shifting channel 46.

As shown in FIGS. 2 and 5, the mirror support 16 comprises a ball stud 50 and a reinforcing plate 52. The ball stud 50 includes a spherical ball 54 and a neck 56 of reduced diameter. The ball 54 is adapted to be universally clamped by a suitable socket member attached to or adjacent to a vehicle windshield. The ball and socket connection thus established accommodates universal movement of the mirror 10 relative to the mounting surface. The neck 56 is attached to the reinforcing plate 52 which is molded into and extends substantially coextensive with the support base 26. The reinforcing plate 52 serves to provide stability for the housing 14 to thereby prevent excessive vibrational movement of the mirror element 12 during vehicle travel.

The housing 14 is provided with an integral triggering mechanism for shifting the mirror element 12 in a hereinafter described manner within the confines of the channel 46 between "day" and "night" viewing positions. In this regard, a generally U-shaped passage 60 is formed in the base 26 adjacent the ledge 40. A rearwardly projecting cylindrical knob 62 formed on the rear surface of the casing 24 registers with the passage 60. Additionally, a laterally offset notch 64 formed in the lip 42 registers with a forwardly projecting tab 66 formed at the lower rim of the flange 30. A pair of laterally spaced upwardly projecting ribs 68 are formed transversely along the ledge 40 to establish a pair of detent grooves 70 and 72, FIGS. 3 and 6.

As shown in FIG. 8, the mirror housing 14 thus far described is molded in a single piece from a suitable plastic such as polypropylene. In its molded state, the housing 14 is generally planar and, in frontal view, has a generally T-shaped profile with the casing 24 constituting an elongated horizontal arm and a support plate 26 conforming to the depending arm. The casing 24 and the support base 26 are integrally connected by the flexible web 28 which has a reduced thickness in comparison with the adjoining sections. To assemble the rear view mirror in operative relationship, the mirror element 12 is snapped into the cavity 30 in the manner previously mentioned. Thereafter, the casing 24 is pivotally folded approximately 180° in a counterclockwise direction about the web 28 into juxtaposed spaced relationship with the base 26. When the lower edge of the flange 30 engages the lip 42, additional pressure is applied to deflect the latter downwardly about the ledge 40 thereby permitting entry of the flange 30 into the shifting channel 46.

Normally, the mirror element 12 will be in the "day" viewing position illustrated in FIGS. 4 and 7 wherein flange 30 is retained within the rearward groove 72 between the ribs 68 the base 30, and the rear reflecting surface 20 is presented for viewing. To position the mirror element 12 in the "night" viewing position shown in FIG. 3 wherein the front surface 18 is reflecting, the operator grasps the lip 42 and the knob 62 and applies a force in the direction of the arrows. This squeezing action causes the casing 24 to relatively pivot in a clockwise direction about the hinge 28 and in so doing yieldably deflect the ledge 40 until the flange 30 passes over the rib 68 and is retained within the forward groove 70. In this position, it will be noted that flange 30 is yieldingly held in position by the rib 68 and the lip 42. Referring to FIGS. 4 and 7, to return the mirror element 12 to the "day" position, the operator grasps the tab 66 and the rear surface of the base 26 and applies a force in the direction of the arrows to cause a counterclockwise pivoting of the mirror element 12 about the web 28. Similarly, this squeezing action causes a downwardly deflecting of the ledge 40 until the flange 30 is yieldingly held in the rearward groove 72 by the rib 64 and the base 26.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. An anti-glare rear view mirror comprising: a generally T-shape housing molded in a substantially planar form from a plastic material, said housing including an elongated mirror casing and a generally rectangular support base hingedly connected at their upper horizontal edges by an integral flexible web having a reduced cross section in comparison with adjacent sections, said web accommodating relative movement between the casing and base and initial folding from the planar state into juxtaposed overlapping operative position; support means for attaching said support base to a mounting surface; a forwardly projecting peripheral flange on said casing terminating at an inwardly turned rim defining a snap-in mirror receiving cavity; a mirror element having plural reflecting surfaces of different reflective power snapped into said cavity over said rim and resiliently held against said casing by said rim and said flange; a ledge formed along the lower end of the support base and projecting forwardly therefrom and terminating with an upwardly projecting lip, the rear surface of said lip and the front surface of said support base defining a shifting channel in which said flange is received at said operative position and defining the limits of operative pivotal movement between the casing and the support base; rib means projecting from said ledge in said channel which is alternately engageable with the flange to establish a first detent position adjacent said front surface of said base and a second detent position adjacent said rear surface of said lip for selectively presenting one or the other of said reflecting surfaces for viewing; an aperture formed in said support base adjacent said ledge; a knob formed on the rear surface of said mirror casing and registering with said aperture, said mirror element being shifted from said first detent position to said second detent position by applying a manual squeezing action between said knob and front surface of said lip as detentably yieldingly accommodated by said rib means thereby presenting one of the reflecting surfaces for viewing; a notch formed in said lip; a tab formed on the front surface of said flange and registering with said notch, said mirror element being shifted from said second detent position to said first detent position by applying a manual squeezing action between said tab and the rear surface of said mirror casing as detentably yieldingly accommodated by said rib means thereby presenting the other of the reflecting surfaces for viewing.

* * * * *